(12) United States Patent
Hirsch (10) Patent No.: US 7,509,387 B2
(45) Date of Patent: Mar. 24, 2009

(54) SYSTEM, APPARATUS, AND METHOD FOR USING REDUCED WEB SERVICE MESSAGES

(75) Inventor: Frederick Hirsch, Melrose, MA (US)

(73) Assignee: Nokia Corporation, Espoo (FI)

( * ) Notice: Subject to any disclaimer, the term of this patent is extended or adjusted under 35 U.S.C. 154(b) by 1108 days.

(21) Appl. No.: 10/819,711

(22) Filed: Apr. 7, 2004

(65) Prior Publication Data
US 2005/0228865 A1    Oct. 13, 2005

(51) Int. Cl.
G06F 15/16    (2006.01)
G06F 12/00    (2006.01)

(52) U.S. Cl. ....................... 709/207; 709/232

(58) Field of Classification Search ............. 709/207, 709/232, 206, 233, 250
See application file for complete search history.

(56) References Cited

U.S. PATENT DOCUMENTS

| | | | |
|---|---|---|---|
| 6,606,525 | B1 | 8/2003 | Muthuswamy et al. |
| 6,772,413 | B2 | 8/2004 | Kuznetsov |
| 2002/0040369 | A1* | 4/2002 | Multer et al. ............... 707/201 |
| 2002/0065822 | A1* | 5/2002 | Itani ............................. 707/7 |
| 2003/0084177 | A1 | 5/2003 | Mulligan |
| 2003/0133554 | A1 | 7/2003 | Nykanen et al. |
| 2004/0045004 | A1 | 3/2004 | Cheenath |
| 2004/0049737 | A1* | 3/2004 | Simon Hunt et al. ........ 715/513 |
| 2004/0064484 | A1 | 4/2004 | Polan et al. |
| 2004/0268238 | A1* | 12/2004 | Liu et al. ..................... 715/513 |
| 2005/0060431 | A1 | 3/2005 | Lewontin |
| 2005/0071423 | A1 | 3/2005 | Rajaniemi |

OTHER PUBLICATIONS

Soapuser.com, SOAP Basics, Nov. 13, 2001, Section 3: SOAP Messages, p. 2, http://web.archive.org/web/20011113200005/http://www.soapuser.com/basics3.html.*
Armstrong, Joe, Getting Erlang to talk to the outside world, 2002, ACM New York, NY, pp. 64, 66.*
"WAP Binary XML Content Format", W3C Note, Jun. 24, 1999.
Sep. 21, 2001, Shapiro "[E-Lang] Amusement: proof that XML and lisp forms are interchangeable", Sep. 21, 1999.
Wireless Application Protocol, "Specification Change Document", Oct. 15, 2001.
Wireless Application Protocol, "Binary XML Content Format Specification", Jul. 25, 2001.

* cited by examiner

Primary Examiner—Zarni Maung
(74) Attorney, Agent, or Firm—Hollingsworth & Funk, LLC (57) ABSTRACT

A Web service of a network entity can be invoked using reduced messages. A redundancy agreement message is sent to the network entity. The redundancy agreement message describes a redundancy agreement for invoking the Web service using reduced messages. A reduced message is formed based on the redundancy agreement and a non-redundant portion of a Web service message that may be used for invoking the Web service. The reduced message is sent to the network entity and the Web service is invoked at the network entity based on the reduced message and the redundancy agreement.

52 Claims, 6 Drawing Sheets

SYSTEM, APPARATUS, AND METHOD FOR USING REDUCED WEB SERVICE MESSAGES

FIELD OF THE INVENTION

This invention relates in general to Web services, and more particularly, to communications involving Web service messages.

BACKGROUND OF THE INVENTION

The World Wide Web is most commonly associated with the access and display of content (e.g., text, graphics) in Web browsers. However, the emergence of what are known as "Web services" has been used to extend the World Wide Web's usefulness by providing access to computational procedures over the Web. Web services use some of the same open and extensible protocols and formats that have made Web browsers so useful, yet allow information to be accessed by programs and applications besides browsers. As a result, Web services can be powerful tools for providing distributed data access in many application domains.

Web services are network-based (particularly Internet-based) applications that perform a specific task and conform to a specific technical format. Web services may be implemented using a stack of emerging standards that describe a service-oriented application architecture, collectively providing a distributed computing paradigm having a particular focus on delivering services across the Internet.

Generally, Web services are implemented as self-contained modular applications that can be published in a ready-to-use format, located, and invoked across networks. When a Web service is deployed, other applications and Web services can locate and invoke the deployed service. They can perform a variety of functions, ranging from simple requests to complicated business processes.

Web services are typically configured to use standard Web protocols such as Hypertext Transfer Protocol (HTTP) and formats such as the Extensible Markup Language (XML) but may use other protocols and formats as well. Web services are distinguished through the use of SOAP (the first version was an acronym for Simplified Object Access Protocol) and are commonly associated with a Web Services Description Language (WSDL) description. HTTP is an application-level protocol commonly used to transport data on the Web. XML is a mechanism to define markup languages. Some markup languages (e.g., HTML) are used mainly to describe how a document is to be formatted for display. Others are defined to describe application data. SOAP is a markup language for message encapsulation and is typically used to transmit messages that invoke remote procedure calls, return the results from such invocation, or transmit documents.

The availability of Web services makes the Web an even more powerful communications medium. Web services enable a service-oriented architecture to be created using existing Web technologies. Any Web-services-aware program can invoke other services, enabling applications to be dynamically composed from reusable components. Hence, Web services can be a part of a program carrying out any kind of computation, yet can be accessed and run anywhere due to the ubiquity of the Internet and its associated protocols. Further, the Web service standards can be adapted handle almost any type of data, due to the use of extensible languages such as XML.

The flexibility and extensibility of typical Web services such as SOAP come at a cost, however. The text based, tagged format of XML is quite verbose. Such XML text representations are preferred for Web services because they enable interoperability and are easy to read and debug. However, text representations are not the most efficient form in which to transmit data, and therefore require more bandwidth to transmit than is theoretically necessary. The tags and other required fields in XML increase the data overhead when using these types of Web services, especially on small, simple transactions.

Although the Web network infrastructure is increasingly adding bandwidth capacity, many users are forced to rely on limited bandwidth connections. This is especially true of mobile device users. The physics of wireless data transfer makes it much more difficult to provide high bandwidth at a reasonable cost. As a result, the bandwidth available to mobile devices is not necessarily catching up to the processing power provided in the devices themselves. As a result of bandwidth limitations, users of mobile devices may not be able to efficiently use Web services utilizing protocols such as SOAP without consideration of these factors.

SUMMARY OF THE INVENTION

The present disclosure relates to a system, apparatus, and method for using reduced Web services messages. In accordance with one embodiment of the invention, a method involves invoking a Web service of a network entity. A redundancy agreement message is sent to the network entity. The redundancy agreement message describes a redundancy agreement for invoking the Web service using reduced messages. A reduced message is formed based on the redundancy agreement and a non-redundant portion of a Web service message configured for invoking the Web service. The reduced message is sent to the network entity and the Web service is invoked at the network entity based on the reduced message and the redundancy agreement.

In more particular embodiments, any of the Web service message, reduced message, and the redundancy agreement message may include a SOAP message. The redundancy agreement message may include a binary formatted message. The redundancy agreement may include mapping of identifiers to content strings. The content strings are based on a non-redundant portion of the Web service message. The content strings may be base64 encoded.

In other configurations, the method may involve sending a redundancy agreement reply message from the network entity in response to the redundancy agreement message. The redundancy agreement reply message may include a suggested modification to the redundancy agreement. The redundancy agreement message may be included in a non-reduced Web service message, such as in a message header of the non-reduced Web service message.

Invoking the Web service at the network entity based on the reduced message and the redundancy agreement may involve creating a template based on the redundancy agreement and forming a replicated Web service message from the template by replacing portions of the template with selected portions of the reduced message. In one arrangement, at least one of the selected portions of the reduced message and the portions of the template may include any combination of LISP encoded values, base64 encoded values, and XML elements. The reduced message may include one or more XML processing instructions indicating the portions of the template to be replaced and the selected portions of the reduced message. The one or more XML processing instructions may be base64 encoded. The reduced message may also use XML tags as replacement indicators, placing encoded processing instructions or LISP encodings within these XML elements.

In more particular embodiments, the method involves determining a quality measurement based on sizes of the reduced message and the Web service message. The quality measurement may be used to determine whether to utilize the redundancy agreement and/or used to determine a form of the redundancy agreement.

In another embodiment of the present invention, a computing arrangement includes a network interface, a memory capable of storing at least one of a redundancy agreement module and a Web services processing module, and a processor coupled to the memory. The processor is configured by redundancy agreement module to form redundancy agreement messages describing redundancy agreements for invoking Web services using reduced messages. The processor is configured by the Web services module to send the redundancy agreement messages and the reduced messages via the network interface using a Web service protocol for purposes of invoking the Web service. The network interface may include a wireless network interface and the computing arrangement may include a mobile terminal.

In another embodiment of the present invention, a messaging system includes means for sending a redundancy agreement message to a network entity. The redundancy agreement message describes a redundancy agreement for invoking the Web service using reduced messages. The system also includes means for forming a reduced message based on the redundancy agreement and a non-redundant portion of a Web service message configured for invoking the Web service, means for sending the reduced message to the network entity, and means for invoking the Web service at the network entity based on the reduced message and the redundancy agreement. The system may also include means for determining a quality measurement based on the sizes of the reduced message and the Web service message.

In another embodiment of the present invention, a computer-readable medium has instructions stored which are executable by a computing arrangement for performing steps that include sending a redundancy agreement message to a network entity for purposes of invoking a Web service. The redundancy agreement message describes a redundancy agreement for invoking the Web service using reduced messages. The steps also include forming a reduced message based on the redundancy agreement and a non-redundant portion of a Web service message configured for invoking the Web service, sending the reduced message to the network entity, and invoking the Web service at the network entity based on the reduced message and the redundancy agreement.

In another embodiment of the present invention, a computing arrangement configured to provide a Web service includes means for receiving a redundancy agreement message from a network entity. The redundancy agreement message describes a redundancy agreement for invoking the Web service using reduced messages. The computing arrangement includes means for receiving a reduced message based on the redundancy agreement and a non-redundant portion of a Web service message configured for invoking the Web service, and means for invoking the Web service based on the reduced message and the redundancy agreement. The computing arrangement may also include means for sending a reduced response message to the network entity in response to invocation of the Web service. The reduced response message is based on a second redundancy agreement established between the computing arrangement and the network entity.

In another embodiment of the present invention, a computing arrangement is configured to act as a proxy for providing a Web service. The computing arrangement includes means for receiving a redundancy agreement message from a first Web service entity. The redundancy agreement message describes a redundancy agreement for supporting the Web service invocation using reduced messages. The computing arrangement includes means for receiving a reduced message based on the redundancy agreement and a non-redundant portion of a Web service message configured f to support the Web service invocation, means for converting the reduced message to a replica of the Web service message based on the reduced message and the redundancy agreement, and means for sending the replica of the Web service message to a second Web service entity in support of the Web service invocation. The computing arrangement may also include means for receiving a Web service response message from the second Web service entity; and means for sending to the first Web service entity a reduced response message. The reduced response message is based on the Web service response message and a second redundancy agreement established between the computing arrangement and the first Web service entity.

BRIEF DESCRIPTION OF THE DRAWINGS

The invention is described in connection with the embodiments illustrated in the following diagrams.

DETAILED DESCRIPTION OF THE INVENTION

In the following description of the example embodiments, reference is made to the accompanying drawings that form a part hereof, and in which is shown by way of illustration various example embodiments in which the invention may be practiced. It is to be understood that other embodiments may be utilized, as structural and operational changes may be made without departing from the scope of the present invention.

Generally, the present disclosure is directed to a system, apparatus, and method that reduces the size of Web service messages communicated between network entities. The Web service messages can be partitioned into redundant and non-redundant data. The redundant data does not change for all invocations of the same interface between two entities, so may be unnecessary for repeated, similar Web service transactions. The redundant data can be removed from the messages by negotiating a redundancy agreement between two network entities. Once the agreement is accepted by both entities, a reduced message can be formed from the non-redundant data and sent over a communications link.

It will be appreciated that XML and XML-based Web services (e.g., SOAP) offer a major advantage of interoperability. This is important in a service-oriented architecture, where new relationships and services are to be dynamically added without requiring extensive re-engineering. This ability to dynamically adapt Web services is extremely valuable from a business perspective and can override technical issues. Thus, when attempting to improve SOAP message performance, it is important to maintain the business benefits of XML.

SOAP messages can be large due to the XML serialization that introduces much redundancy. The verbosity of XML can be useful for readability and extensibility, but is inefficient from the perspective of network usage. Use of SOAP messages can be an issue when network bandwidth is constrained, increasing latency and costs. It can also impact storage requirements at processing nodes that must store messages (e.g., when waiting to aggregate information).

Within a single SOAP message, there are some redundancies that can be addressed. For example, each start tag is replicated with an end tag. SOAP and XML best practices recommend long, readable tags. By reducing or eliminating some of these tags, the reduction in space can be large when big messages are processed. Using end tags results in duplicating these large tags. Similarly, namespace declarations are often long strings that are redundantly used many times.

A simple encoding that eliminates all end-tags can produce a 20% savings or more with minimal processing. Use of a LISP representation allows this encoding to retain the essential XML InfoSet structure without the use of end tags. Communicating parties may also be aware of large redundant strings, such as namespace URLs or other strings and wish to encode these strings with shorter abbreviations. This disclosure describes a dynamic means to manage such definitions.

Much redundancy can be found across a series of messages between communicating parties when considering all messages sent over time (not limited to a single message exchange pattern). For example, if a SOAP message is used like a form where most of the message is fixed and only small amounts of information are changed, then much redundancy can be removed by only sending a reduced message with only the changed data.

Utilizing reduced messages requires the sender and receiver to agree on the form and what is sent. In one example, the agreements on the redundant and non-redundant data may be presumptive, that is, established before any communications have taken place. A presumptive agreement may be difficult to implement, especially when interactions are established dynamically or as forms change over time. The approaches described herein may allow dynamic decisions to be made between parties as to what is redundant data without requiring a presumptive, pre-agreement.

Creating a generalized global redundancy system is intractable. A major problem is to establish globally unique identifiers for redundant text while keeping these identifiers small. It will be appreciated that if the identifiers grow large, it will defeat the benefits of redundancy reduction. It is also a challenge to ensure the consistency of this representation among SOAP nodes regardless of communication patterns. Consider the example of FIG. 1 where four SOAP nodes all communicate with each other.

Figure 1:
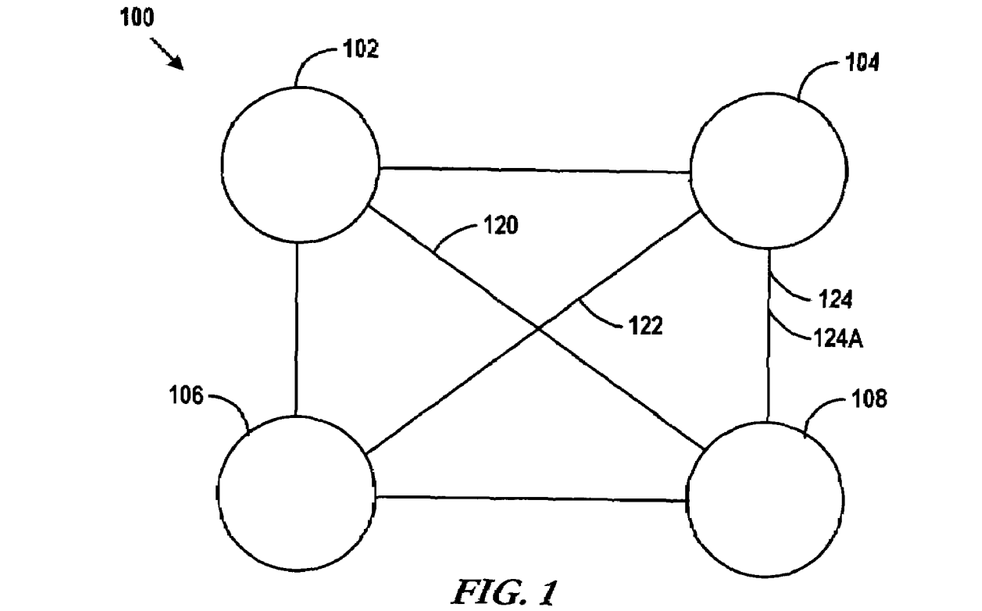
FIG. 1 illustrates network connectivity related to reduced message processing.

The diagram 100 of FIG. 1 illustrates inter-nodal Web services communications according to embodiments of the present invention. The nodes 102, 104, 106 and 108 may each engage in data communications with each other. The problem with attempting to make global redundancy in such a scenario can be demonstrated with the steps 120, 122, and 124 (illustrated as arcs in FIG. 1):

Step 120: Node 102 agrees with node 108 that "<soap:Envelope>" is represented with "1."

Step 122: Meanwhile node 106 agrees with node 104 that "<order>" is represented with "1."

Step 124: Next node 104 communicates with node 108 but cannot agree on an encoding for "<soap:Envelope>" since both nodes 104 and 108 have used "1" inconsistently.

One approach to solve the above problem would be to have an administrative protocol running continuously to update all nodes with global information. Such an administrative protocol would introduce overhead, reducing the benefits of redundancy removal. Even if such a protocol could effectively reduce overall redundancy, such an update mechanism would be subject to potential race conditions. In the previous example, an update would need to happen after step 120 but before step 122, yet in reality these steps could be happen simultaneously in a distributed environment, creating a race condition.

Creating long unique identifiers based on the content to be reduced might work in the scenario described above, but collisions are inevitable if a larger space is mapped to a smaller space. By using pair-wise agreements, these problems may be avoided. Pair-wise agreements may still introduce the overhead of establishing and maintaining these agreements. This overhead may be acceptable if the parties are already communicating and the overhead is small relative to the overall communication.

In the case of pair-wise agreements the previous scenario is not an issue. The first two steps 120, 122 are the same as above, but with the following third step:

Step 124A: Node 104 agrees with node 108 that "<soap:Envelope>" is represented with "2."

This disclosure is related to a protocol that uses pair-wise agreements for redundancy removal in Web service communications. This is useful between parties that have a long-running communication pattern involving many Web service messages, thereby reducing the impact of protocol overhead. Managing redundancy independently between pairs of communicating parties avoids the need for global consistency management, and scales by leveraging support for existing communication patterns.

One of the advantages of a service oriented architecture, and of Web services in particular, is that an application can dynamically compose services as well as change providers without extensive re-engineering, interoperation testing, or static configuration management. The benefits of flexibility would be lost if a performance mechanism required static configuration. Static configuration is also more labor intensive, costly and error-prone. This suggests that communicating end parties first agree to use redundancy removal, and then agree what is to be encoded as part of an agreement protocol. Although redundancy agreement protocols are described herein using SOAP/XML examples, it will be appreciated that these concepts are equally applicable to other service-oriented architectures and protocols.

A redundancy protocol implemented in SOAP/XML should use a SOAP header block mechanism to allow it to be composed with other SOAP extensions, such as SOAP message security, for example. The redundancy protocol can also use a header mechanism to avoid changes to payload for agreement, allowing it to be used with a variety of application defined payloads. The protocol can also make it possible to transfer the payload as well as redundancy agreement protocol information in one message, using such "piggybacking" to reduce the overhead of redundancy control. The protocol mechanism may include the ability to bootstrap, either for a new participant or to recover from errors and to re-establish synchronization.

The redundancy removal mechanism is general purpose, allowing different granularities of information to be encoded, including:
1. Strings, e.g., whitespace delimited strings found in the body, headers or markup.
2. Tags, e.g., <soap:Envelope>.
3. Arbitrary XML, e.g.,

```
<x:Address>
  <street>57 Oak St</street>
  <city>Cambridge</city>
  <state>MA</state>
  <countryCode>US</countryCode>
</x:Address>
```

4. Binary content, e.g., a base64 encoded X.509 certificate.
5. XML content with substitutions, enabling XML to be treated like a form.

How parties choose the redundancy may be application dependent. The parties may choose the redundancy agreement based on knowledge of message meaning and level of redundancy. For example, the application may detect that this is an XML form. The parties may also choose the redundancy agreement using a predictive scheme based on previous message content. For example, the application may track pattern frequencies to predict redundancy.

Components of an exemplary redundancy removal mechanism include: (1) a Redundancy Agreement Protocol (RAP)—protocol used to agree on what redundant information to encode and how to encode it; (2) a Replacement Encoding Indicator (REI)—a procedure for replacing content with message encoding indicator; (3) LISP Encoding for SOAP messaging (LES)—Use of LISP to capture hierarchical XML structure, eliminating need for XML end tags; and (4) Redundancy Reduction Quality Measure (RRQM)—an optional mechanism to dynamically track redundancy reduction quality.

The first component of a redundancy removal mechanism, the RAP, is discussed first. Reducing redundancy requires an agreement between communicating parties on how to represent the redundant information so that they can consistently recreate the information in its original form. The potential difficulty is that multiple parties may all communicate with each other in different patterns dynamically establishing different incompatible redundancy mechanisms.

An agreement mechanism that does not attempt to achieve global consistency solves this problem in a scalable manner since the agreements only involve parties that already manage information about each other. Generally, long-term communications are between small numbers of parties. Each communicating party agrees with a single partner which redundancy mechanism to use with that party—recording this information allows communication between the two parties and does not interfere with communication with others.

Redundancy removal may be accomplished by maintaining a synchronized mapping at the two communicating parties, e.g., mapping small integers (e.g., 1, 2,3) with the corresponding redundant content. Rather than sending the content, the identifying number is sent. The table is established and managed using SOAP headers designed to function as a redundancy removal agreement protocol.

A message sender decides which text is potentially redundant and chooses to map each section of redundant text to a small unique identifier that it has not already used with the receiver of the message. If the sender already has an identifier for redundant information for that party then it uses that identifier again and there is no need to re-establish the agreement.

For each new piece of redundant information the sender generates an XML redundancy mapping element to map the identifier to the redundant information:

```
<map>
  <id>2</id>
  <content>abc</content>
</map>
```

Redundant text may also include "holes", e.g. portions that may be filled in using values matching the mapping template. The <map> element supports definition of a value marker used in the definition of redundant content. This marker specifies where replacement values go, "V" in this example:

```
<map>
  <id>3</id>
  <repl cnt="1">V</repl>
  <content><a>V</a></content>
</map>
```

The optional "cnt" attribute specifies the number of replacements to be expected. Note that unique replacement strings could be defined for each replacement. This could be done with repeated occurrences of the "repl" and "content" elements within the map element, or by using additional map elements having a different ID. However, where the replacements are ordered, this is unnecessary and would add overhead. Ordered replacements can be handled by including a single value marker in the "content" element wherever a replacement is needed. When placing the replacement values in the template, the values are provided as a collection, or list. Each value is taken off the list and consecutively inserted in place of each marker.

Although placing redundant XML in the map element may keep the XML well-formed, it is preferable that all content be base64 encoded before mapping. This assures that the description is well-formed and, therefore, that a SOAP message header containing it is well-formed and valid. Before base64 encoding, replacement markers may be placed in the redundant content, to allow it to act as a template. An example is shown below:

```
<map>
  <Id>2</Id>
  <b64>YWJj</b64>
</map>
```

Note that the redundancy agreement mechanism described in this application may also support other encodings than base64. Such encodings may be represented using other tags, as would be known to those familiar with the art. Note also that an alternative implementation could use type attribute with the content tag to represent various encodings of the value, for example:

```
<content encoding='b64'>YWJj<content>
```

This example shows a specific XML tag (content) and attribute (encoding) to signify base64 encoding, but other tag and attribute names could be used for this purpose.

One or more <map> elements may be contained in a single Redundancy Agreement Protocol SOAP header block:

```
<r:rap xmlns:r="http://www.nokia.com/rap" role="next"
mustUnderstand="1">
</r:rap >
```

If a target SOAP role does not understand the header block it generates a SOAP fault and this redundancy reduction mechanism is not used. It is also possible to determine through the service description, or by out of band mechanisms or through the use of policy headers whether redundancy reduction is supported, allowing the sender to only request it when appropriate. It is also possible for a receiver to indicate that it does not support the mechanism.

If the redundancy agreement protocol is supported, then a receiver processes the header block by examining each <map> element to determine if that ID has been used and also if that text is already stored for the sender. The following possibilities may exist: 1) The text has no entry and the ID has not been used; The receiver may "accept" this proposal; 2) The text has no entry but the ID has been used; This may occur if this receiver has sent a proposal to the sender and used this ID for different text. The two messages "crossed" during communication. The receiver may propose a different ID. 3) The text has an entry for the same ID. The receiver may "accept" this proposal. The sender must have cleared its table for some reason. 4) The text has an entry for a different ID. The receiver may propose this different ID. Responses are OK (accept) or Map (provide mapping).

The response header block may contain an OK statement for each ID that has been accepted. The response header block may also contain a map statement for each new ID proposal. For example:

```
<ok>1</ok>
<map>
    < id>7</id>
    <content>abc</content>
</map>
```

The protocol exchange continues until all IDs have been agreed upon. This means that if a response has a map statement, or an ID has been ignored that is not agreed, the party must either accept the proposed ID, or suggest a mapping with a different ID that was proposed (or ignored).

Another approach is for the sender to assign IDs starting at the low end (e.g. 1) and for the receiver to assign them starting at the high end (e.g. 1024) minimizing collisions if the range is large enough. This minimizes the need for multiple agreement messages for IDs. Other redundancy options may also be agreed upon using the RAP SOAP header. Specifically, the encoding attribute may be used to agree upon LISP serialization (default, "LISP") or XML serialization ("XML"). Note that redundancy reduction techniques may be integrated with XML canonicalization processing, thus reducing the overhead of reduction, since that processing is performed anyway. This can be used in conjunction with a minimalist SOAP profile, for example.

Once the RAP has established an agreed upon scheme for sending reduced messages between entities, each entity utilizes a mechanism for translating between the messages in original and reduced form. These mechanisms include formatting/ordering the non-redundant data for transmission by sending entity and interpreting the reduced message at the receiving entity.

Redundancy may be reduced by not sending the redundant information and either 1) knowing what it is out of band or 2) sending an identifier to indicate the information that should be restored at which spot. These techniques require a mechanism to distinguish between mapped content and unmodified original content, since the two may be mixed. The locations of the data within the reduced messages may be indicated by a replacement encoding indicator (REI). In one example, XML processing instructions can be used as REIs. A replacement encoding indicator may be implemented using XML processing instructions, a LISP serialization, or an XML replacement encoding.

Use of XML processing instructions has the advantage that they are a well-defined XML construct and are not a legal SOAP messaging construct (but neither is LISP encoding). Use of disallowed characters for REI is not workable, not to mention dangerous, as is the use of entity references. Additional XML markup may be used for REI, but this would defeat the purpose of redundancy removal. XML processing instructions are short and well suited to the purpose.

Given that XML processing instructions are disallowed by the SOAP standard, it is unlikely that a processing instruction will be present for any reason other than redundancy removal. Even if so, it is also unlikely that a processing instruction matching the form used for redundancy removal will be present.

When using XML processing instructions to implement a replacement encoding indicator, two forms may be used. If the replacement text is constant, then that replacement content may be indicated with an agreed upon number placed as the sole value of the XML processing instruction (e.g., <?7?>). If value substitution is to be used, then the processing instruction must also contain the values to substitute in the redundancy template, placed as an ordered list following the number indicating replacement content. Each value is preferably base64 encoded to ensure that all spacing is preserved and then placed within parentheses, creating a list of values within the processing instruction following the redundancy agreement template value. (e.g., <?6 (value1) (value2)?>).

As previously described, a LISP encoding of XML data can provide significant message size reduction by removing redundancy inherent in the XML end tags. LISP serialization replaces start and end tags with a list structure of the following form:

```
(tag-name ((argument1 value1) (argument2 value2) ... )
            element-content)
```

This corresponds to the XML:

```
<tag-name argument1="value1" argument2="value2">element
            content</tag-name>
```

When using LISP encoding, each argument that is present in the original start tag denoted using argument="value" now has the argument as the first item in a parenthesized list and the quoted value as the second item. The "=" sign is removed. If the start tag had no arguments then the tag name is followed by an empty LISP list, e.g. (). It will be appreciated that the LISP serialization may involve variations on how the arguments are quoted in the LISP representation, or whether they are included in a sub-list. Note that this applies regardless of the XML quoting used, either single or double quotes.

Note that the end tag-name overhead is eliminated, the parentheses for the element and the argument list use the same space as the original start and end tag brackets, and that one of the parentheses for each argument list replaces each equals sign. The savings in the end tag text must balance the extra parenthesis for each argument.

An XML replacement encoding is necessary when the receiver needs to be able to use a standard XML and SOAP parser to process the message. In this case portions of the XML may be replaced with redundancy encoding indicators, but the use of XML processing instructions or pure LISP encoding may cause the standard SOAP processing to fail. In this case the redundancy encoding indicator may be an XML tag in a unique XML namespace, containing a base64 encoded processing instruction or LISP encoding of the redundancy information. For example, the following XML message may need to remain intact to allow SOAP processing, yet may have redundant portions of the payload replaced:

```
<env:Envelope xmlns:env="http://www.w3.org/2003/05/soap-envelope">
  <env:Header> . . . </env:Header>
  <env:Body>
    <x:Address xmlns:x="http://www.example.com/address">
      <x:street>57 Oak St</x:street>
      <x:city>Cambridge</x:city>
      <x:state>MA</x:state>
      <x:countryCode>US</x:countryCode>
    </x:Address>
</env:Body>
```

The address portion may be removed in a redundancy encoding as follows:

```
<env:Envelope xmlns:env="http://www.w3.org/2003/05/soap-envelope">
  <env:Header> . . . </env:Header>
<env:Body>
    <r:r xmlns:r='http://www.example.com/rr' type='pi'>PD8xPz4K</r:r>
</env:Body>
```

In this example the value of the "r:r" element is a base64 encoded processing instruction <?1?> that represents the replaced address XML text. The type parameter indicates that the format of the base64-encoded content (processing instruction or LISP form) is the processing instruction form. Note that a default attribute value may allow this XML attribute to be omitted. Note also that the "r" prefix is arbitrary and that the meaning is indicated by the XML namespace. This tag and prefix could be different in an implementation without changing this application.

Systems utilizing reduced messages may require a quality measure that describes the data reduction resulting from RAP mechanisms. The quality of redundancy reduction can be measured and updated with each SOAP message received. This can be used to control how redundancy processing is performed, or whether it is used at all. In one example, two totals are maintained: 1) the total SOAP message bytes received (TotalXfer), and 2) the total SOAP application bytes received (TotalApp). The TotalXfer value includes the size of reduced data messages as well as the size of RAP messages exchanged. The TotalApp value includes the total XML encoded data message bytes received; redundant content and XML serialization is restored before measuring. These totals can be used to calculate the current average redundancy removal percentage over the lifetime of measurement: (TotalApp−TotalXfer)/TotalApp.

A more particular example of RAP mechanisms is presented herein. In reference FIG. 2, an example SOAP message exchange 200 is shown that utilizes redundancy mechanisms according to embodiments of the present invention. The message exchanges in FIG. 2 relate to a hypothetical airline reservations request between a requestor 202 and a reservation service 204. Without any redundancy mechanisms, the typical exchange of this sort would involve standard SOAP messages for a reservation request 210, a clarification request 216, and a clarification response 222. Using the redundancy agreement may involve exchanging additional RAP messages so that the core messages 210, 216, 222 can be exchanged in a reduced format.

Figure 2:
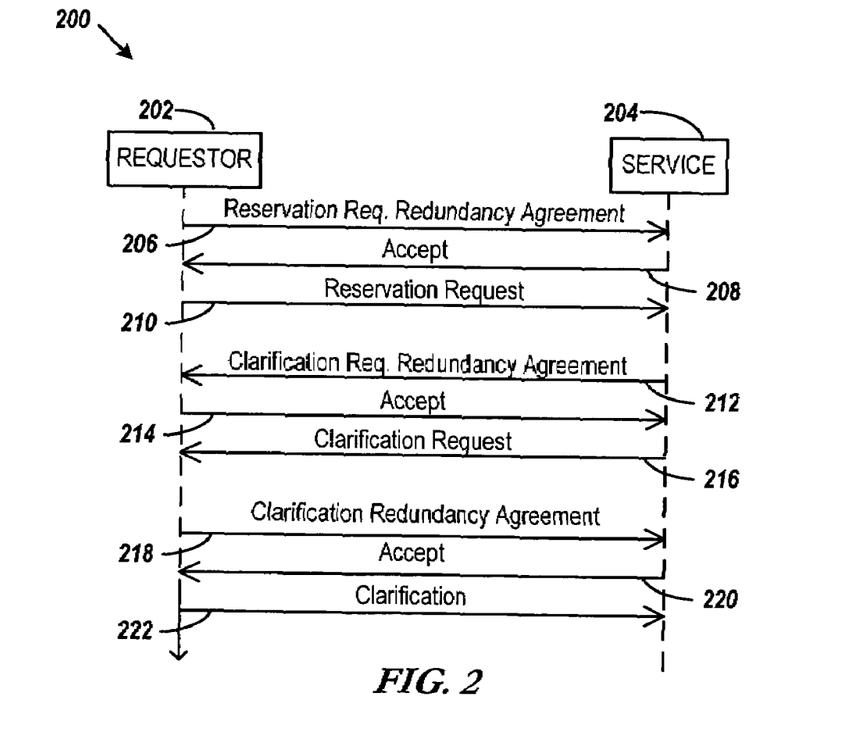
FIG. 2 illustrates an example Web service message exchange according to embodiments of the present invention.

The additional RAP messages include redundancy agreements 206, 212, and 218 associated with each SOAP message 210, 216, and 222, respectively. The receiver of a redundancy agreement will respond with an acceptance or rejection, as indicated by the acceptance messages 208, 214, and 220 associated with the redundancy agreements 206, 212, and 218. It will be appreciated that if the result of a redundancy agreement were a rejection or error then the exchange would continue using standard, unreduced, SOAP messages.

It will also be appreciated that the redundancy agreements 206, 212, and 218 and responses 208, 214 and 220 only need to be used the first time this type of exchange occurs between the requestor 202 and the service 204. Once the redundancy agreements 206, 212, and 218 have been established, any future, similar exchanges between these entities 202, 204 can use reduced messages, with only the non-redundant data altered between subsequent invocations.

Some example messages for the exchanges of FIG. 2 are shown below in Listings 1-6. In particular, the examples of Listings 1-6 illustrate messages 206, 208, and 210 of FIG. 2. Listing 1 shows a SOAP reservation request 210 formed according to the SOAP standard (with lines reformatted for readability):

Listing 1

```
<env:Envelope xmlns:env="http://www.w3.org/2003/05/soap-envelope">
  <env:Header>
    <m:reservation
xmlns:m="http://travelcompany.example.org/reservation"
        env:role="http://www.w3.org/2003/05/soap-envelope/role/next"
        env:mustUnderstand="true">
      <m:reference>uuid:093a2da1-q345-739r-ba5d-pqff98fe8j7d</m:reference>
      <m:dateAndTime>Nov. 29, 2001T13:20:00.000-05:00
      </m:dateAndTime>
    <m:reservation>
    <n:passenger xmlns:n="http://mycompany.example.com/employees"
        env:role="http://www.w3.org/2003/05/soap-envelope/role/next"
        env:mustUnderstand="true">
      <n:name>Åke Jógvan Øyvind</n:name>
    </n:passenger>
  </env:Header>
  <env:Body>
```

Listing 1

```
    <p:itinerary
        xmlns:p="http://travelcompany.example.org/reservation/travel">
        <p:departure>
            <p:departing>New York</p:departing>
            <p:arriving>Los Angeles</p:arriving>
            <p:departureDate>Dec. 14, 2001</p:departureDate>
            <p:departureTime>late afternoon</p:departureTime>
            <p:seatPreference>aisle</p:seatPreference>
        </p:departure>
        <p:return>
            <p:departing>Los Angeles</p:departing>
            <p:arriving>New York</p:arriving>
            <p:departureDate>Dec. 20, 2001</p:departureDate>
            <p:departureTime>mid-morning</p:departureTime>
            <p:seatPreference/>
        </p:return>
    </p:itinerary>
    <q:lodging
        xmlns:q="http://travelcompany.example.org/reservation/hotels">
        <q:preference>none</q:preference>
    </q:lodging>
  </env:Body>
</env:Envelope>
```

Listing 2 illustrates a redundancy agreement message for the SOAP message of Listing 1. Note that the base64 block in Listing 2 contains the substitution template that includes the "V" parameters that mark locations for insertion of the non-redundant data. The use of base64 encoding ensures the SOAP message of Listing 2 is well formed. Listing 3 shows the decoded representation of the base64 encoded block of Listing 2.

Listing 3

```
(env:Envelope ((xmlns:env http://www.w3.org/2003/05/soap-envelope))
    (env:Header ( )
        (m:reservation ((env:role http://www.w3.org/2003/05/soap-
envelope/role/next) (env:mustUnderstand true) (xmlns:m
http://travelcompany.example.org/reservation))
            (m:reference ( ) V)
            (m:dateAndTime ( ) V)
        )
        (n:passenger ((xmlns:n
http://mycompany.example.com/employees) (env:mustUnderstand
true) (env:role http://www.w3.org/2003/05/soap-envelope/role/next))
            (n:name ( ) V)
        )
    )
    (env:Body ( )
        (p:itinerary ((xmlns:p
http://travelcompany.example.org/reservation/travel))
            (p:departure ( )
                (p:departing ( ) V)
                (p:arriving ( ) V)
                (p:departureDate ( ) V)
                (p:departureTime ( ) V)
                (p:seatPreference ( ) V)
            )
            (p:return ( )
                (p:departing ( ) V)
                (p:arriving ( ) V)
                (p:departureDate ( ) V)
                (p:departureTime ( ) V)
                (p:seatPreference ( ) V)
            )
        )
        (q:lodging ((xmlns:q
```

Listing 2

```
<env:Envelope xmlns:env="http://www.w3.org/2003/05/soap-envelope">
    <env:Header>
        <r:rap xmlns:r="http://www.nokia.com/rap" role="next"
mustUnderstand="1">
            <map>
                <id>1</id>
                <repl cnt="14">V</repl>
                <b64>
KGVudjpFbnZlbG9wZSAoKHhtbG5zOmVudiBodHRwOi8vd3d3LnczLm9yZy8yMDAzLzA1L
3NvYXAtZW52ZWxvcGUpKSAgDQogKGVudjpIZWFkZXIgKCkgDQogIChtOnJlc2VydmF0aW
9uICgoZW52OnJvbGUgaHR0cDovL3d3dy53My5vcmcvMjAwMy8wNS9zb2FwLWVudmVsb3B
lL3JvbGUvbmV4dCkoZW52Om11c3RVbmRlcnN0YW5kIHRydWUpKHhtbG5zOm0gaHR0cDov
L3RyYXZlbGNvbXBhbnkuZXhhbXBsZS5vcmcvcmVzZXJ2YXRpb24pKSANCiAgIChtOnJlz
mVyZW5jZSAoKSBWKQ0KICAgKGO6ZGF0ZUFuZFRpbWUgKCkgVikNCiAgKQ0KICAobjpwYX
NzZW5nZXIgKCh4bWxuczpuIGh0dHA6Ly9teWNvbXBhbnkuZXhhbXBsZS5jb20vZW1wbG9
5ZWVzKShlbnY6bXVzdFVuZGVyc3RhbmQgdHJ1ZSkoZW52OnJvbGUgaHR0cDovL3d3dy53
My5vcmcvMjAwMy8wNS9zb2FwLWVudmVsb3B1L3JvbGUvbmV4dCkpIA0KICAgKG46bmFtZ
SAoKSBWKQ0KICApDQogKQ0KICAhbnY6Qm9keSAoKSANCiAgKHA6aXRpbmVyYXJ5ICgoeG
1sbnM6cCBodHRwOi8vdHJhdmVsY29tcGFueS5leGFtcGxlLm9yZy9yZXNlcnZhdGlvbi9
0cmF2ZWwpKSANCiAgIChwOmRlcGFydHVyZSAoKSANCiAgICAgKHA6ZGVwYXJ0aW5nICgp
IFYpDQogICAgIChwOmFycml2aW5nICgpIFYpDQogICAgIChwOmRlcGFydHVyZURhdGUgK
CkgVikNCiAgICAgKHA6ZGVwYXJ0dXJlVGltZSAoKSBWKQ0KICAgICAocDpzZWF0UHJlZm
VyZW5jZSAoKSBWKQ0KICAgKQ0KICAgKHA6cmV0dXJuICgpIA0KICAgICAocDpkZXBhcnR
pbmcgKCkgVikNCiAgICAgKHA6YXJyaXZpbmcgKCkgVikNCiAgICAgKHA6ZGVwYXJ0dXJl
RGF0ZSAoKSBWKQ0KICAgICAocDpkZXBhcnR1cmVUaW1lKCkgIFYpDQogICAgIChwOnNly
XRQcmVmZXJlbmNlICgpIFYpDQogICApDQogICkNCiAgKHE6bG9kZ2luZyAoKHhtbG5zOn
EgaHR0cDovL3RyYXZlbGNvbXBhbnkuZXhhbXBsZS5vcmcvcmVzZXJ2YXRpb24vaG90ZWx
zKSkgDQogICAocTpwcmVmZXJlbmNlICgpIFYpDQogICkNCiApDQogpDQ0=
                </b64>
            </map>
        </r:rap>
    </env:Header>
    <env:Body>
    </env:Body>
</env:Envelope>
```

-continued

Listing 3 http://travelcompany.example.org/reservation/hotels))
    (q:preference ( ) V)
    )
  )
)

Listing 4 illustrates the response message 208 of FIG. 2 that indicates the redundancy agreement of Listing 2 has been accepted.

Listing 4

```
<env:Envelope xmlns:env="http://www.w3.org/2003/05/soap-envelope">
    <env:Header>
        <r:rap xmlns:r="http://www.nokia.com/rap" role="next"
mustUnderstand="1">
            <ok>1</ok>
        </r:rap>
    </env:Header>
    <env:Body>
    </env:Body>
</env:Envelope>
```

The message in Listing 5 is the reduced message that includes a list entry for each value, a base64 encoded value used to avoid problems with whitespace handling. This information can be combined with the redundancy agreement template of Listing 2 to form a message equivalent to that shown in Listing 1. Listing 6 shows the message of Listing 5 without the base64 encoding, to clarify how the mechanism functions.

Listing 5

```
<?1
(dXVpZDowOTNhMmRhMS1xMzQ1LTczOXItYmE1ZC1wcWZmOThmZThqN2Q=)
(MjAwMS0xMS0yOVQxMzoyMDowMC4wMDAtMDU6MDA=)
(d2t1IEp6Z3ZhbiB4eXZpbmQ=)
(TmV3IFlvcms=)
(TG9zIEFuZ2VsZXM=)
(MjAwMS0xMi0xNA==)
(bGF0ZSBhZnRlcm5vb24=)
(YW1zbGU=)
(TG9zIEFuZ2VsZXM=)
(TmV3IFlvcms=)
(MjAwMS0xMi0yMA==)
(bWlkLW1vcm5pbmc=)
( )
(bm9uZQ==)
?>
```

Listing 6

```
<?1
uuid:093a2da1-q345-739r-ba5d-pqff98fe8j7d
Nov. 29, 2001T13:20:00.000-05:00
wke Jzgvan xyvind
New York
Los Angeles
Dec. 14, 2001
late afternoon
```

-continued

Listing 6

```
aisle
Los Angeles
New York
Dec. 12, 2001
mid-morning
none
?>
```

It will be appreciated that the message reduction techniques described in relation to Listings 1-6 can be applied to the remaining message exchanges illustrated in FIG. 2. In general, the message reduction techniques described herein may be applied to set of Web service messages that are exchanged between hosts. The use of redundancy agreements allows these exchanges to be ad hoc, only requiring that the hosts be able to understand and apply the redundancy agreements before utilizing the reduced messages. Where redundancy agreements cannot be made, message exchanges can resume according to the default Web service standards.

Figure 3:
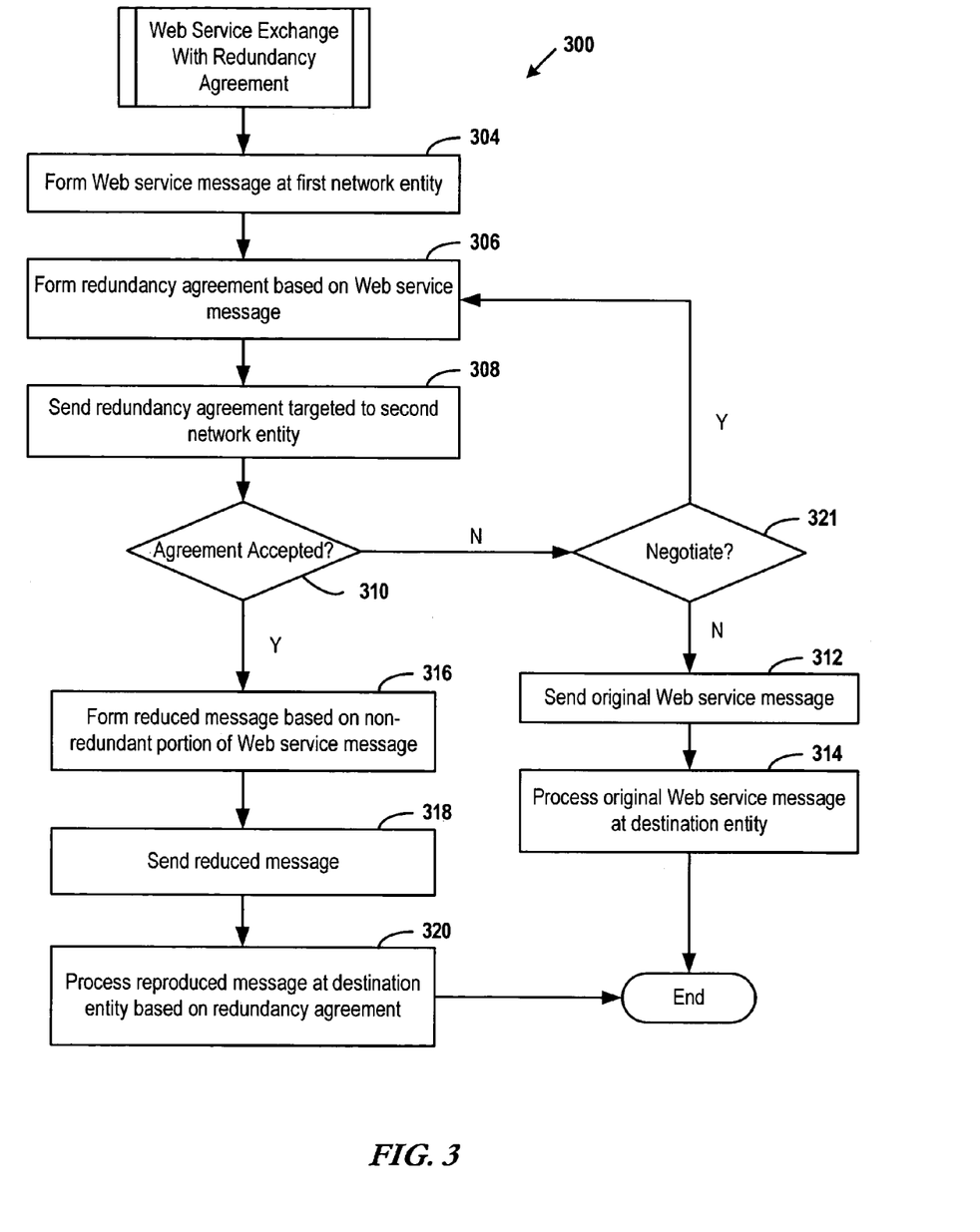
FIG. 3 illustrates a procedure for implementing Web service redundancy agreements according to embodiments of the present invention.

A flowchart 300 of FIG. 3 illustrates an example procedure of performing Web service communications using redundancy agreements according to embodiments of the present invention. The procedure begins with a first network entity forming a Web service message (304), e.g., a SOAP message. The Web service message does not necessarily need to be formed as a fully formatted XML message, but generally the information needed to form the message (e.g., an XML InfoSet, information for a remote method invocation, a document and related message information, etc.) is in place such that a standard SOAP message could be formed. A redundancy agreement is then formed (306) based on at least the non-redundant parts of the Web service message. The redundancy agreement is sent (308) across a network or other communication means and targeted for a second data processing entity. The second network entity may be the destination of the SOAP message, or may be some intermediate entity.

The first network entity receives a reply in response to the redundancy agreement, and checks 310) the result of the reply. If the result is a SOAP fault or other rejection of the redundancy agreement, the Web service message is sent (312) in its original format to the destination, where it is processed (314). However, if the check (310) results in an acceptance of the redundancy agreement (or negotiations ensue (321) that result in a mutually acceptable agreement), a reduced message is formed (316) by the first network entity and sent (318) to the destination where it is processed (320).

The processing (320) of the message may occur by converting the reduced message to a fully formed SOAP message which is then forwarded on to a SOAP processing module, or by processing only the data contained in the reduced message. In the former case, the module that reduces the message acts as a "front-end" to a standard SOAP processing stack. In the latter case, the reduced messaging functionality may be included in the SOAP processing stack, such that there is no need to convert the reduced message to a fully formed SOAP message.

Figure 4:
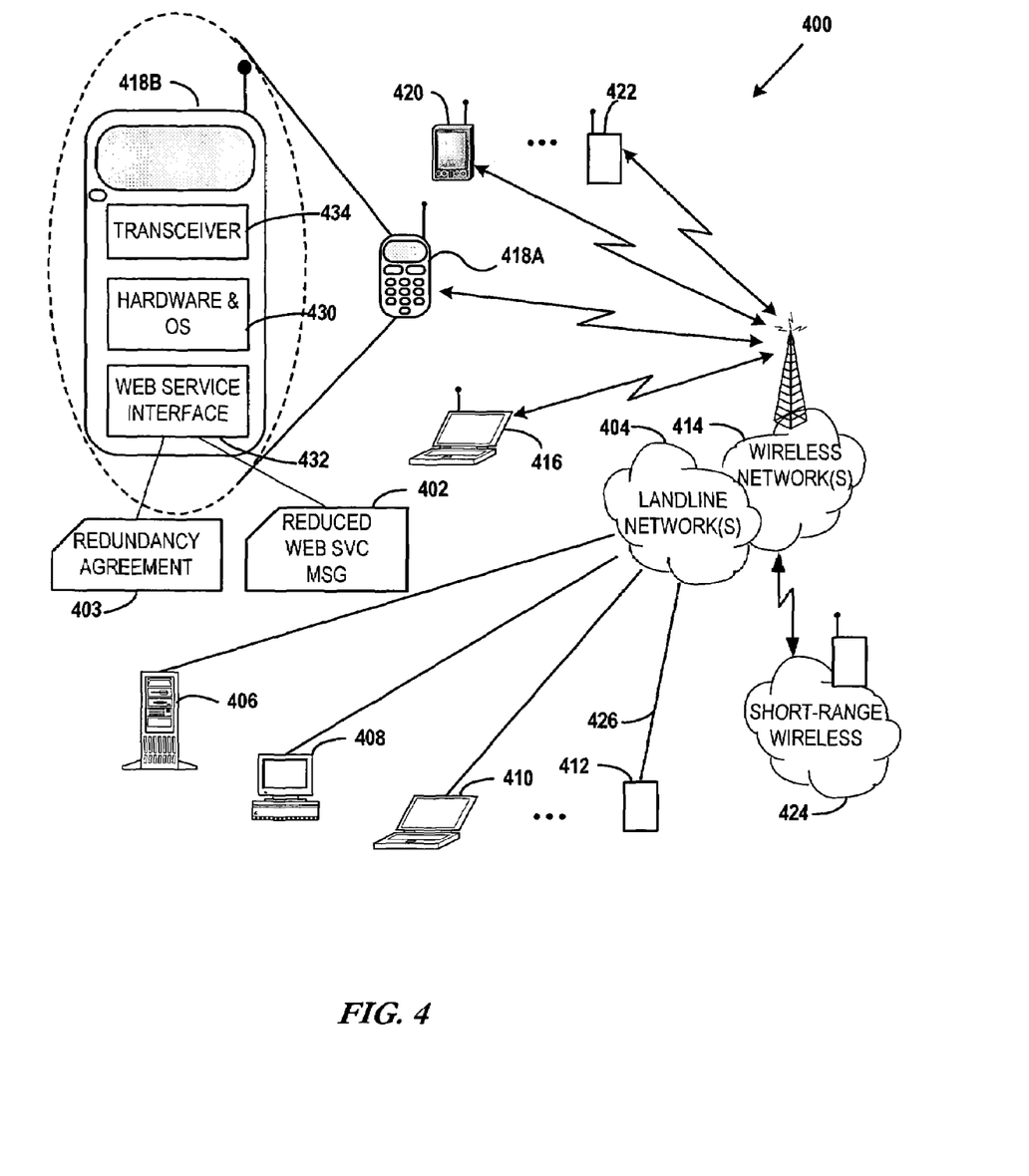
FIG. 4 illustrates a system environment in which a Web service messaging according to embodiments of the present invention may be employed.

The network clients, servers and other data processing elements for providing Web service messaging systems in connection with the present invention may be any type of computing device capable of processing and communicating digital information. Referring now to FIG. 4, a representative system environment 400 is illustrated in which Web services may be employed according to embodiments of the present invention. In the representative system environment 400, Web services may be communicated using a reduced Web service message 402 and a redundancy agreement 403, which may take the form of a Web service message.

The Web service messages 402, 403 may be communicated between target devices in any number of known manners. These manners include via a landline network(s) 404, which may include a Global Area Network (GAN) such as the Internet, one or more Wide Area Networks (WAN), Local Area Networks (LAN), and the like. Any computing device or other electronic device that supports Web services may be the target system that utilizes the present invention, such as servers 406, desktop computers 408 or workstations, laptop or other portable computers 410, or any other similar computing device capable of communicating via the network 404, as represented by generic device 412.

The Web service messages 402, 403 may be communicated via one or more wireless networks 414, such as Global System for Mobile Communications (GSM), Universal Mobile Telecommunications System (UMTS), Personal Communications Service (PCS), Time Division Multiple Access (TDMA), Code Division Multiple Access (CDMA), or other mobile network transmission technology. Again, any mobile electronic device can communicate with Web service message 402, 403, such as laptop or other portable computers 416, mobile phones 418A and other mobile communicators, Personal Digital Assistants (PDA) 420, or any other similar computing device capable of communicating via the wireless network 414, as represented by generic device 422.

The Web service messages 402, 403 may be transferred between devices using short-range wireless technologies 424, such as Bluetooth, Wireless Local Area Network (WLAN), infrared (IR), etc. The Web service messages 402, 403 can also be distributed using direct wired connections, such as depicted by connection path 426. The present invention is applicable regardless of the manner in which data is provided or distributed between the target devices.

An example of a target device that utilizes Web service messaging is illustrated as the mobile phone 418B. The mobile phone 418B includes, for example, a radio transceiver 434 and hardware (including the processor) coupled to an operating system (OS) 430. A Web services interface 432 may be implemented as firmware or as a program running on the OS 430. The Web services interface 432 may use any combination of Web service protocols known in the art, including SOAP, XML-Remote Procedure Call (XML-RPC) and others, and may be described and discovered using Universal Description, Discovery and Integration (UDDI), and Web Services Description Language (WSDL), among other possibilities.

The Web services interface 432 communicates using a reduced Web service message 402 according to embodiments of the present invention. The reduced Web service message 402 is formed based on a redundancy agreement 403 maintained between the mobile phone 432 and another entity on the network. The redundancy agreement 403 may be used to convert between a standard Web service message and the reduced message 402.

Figure 5:
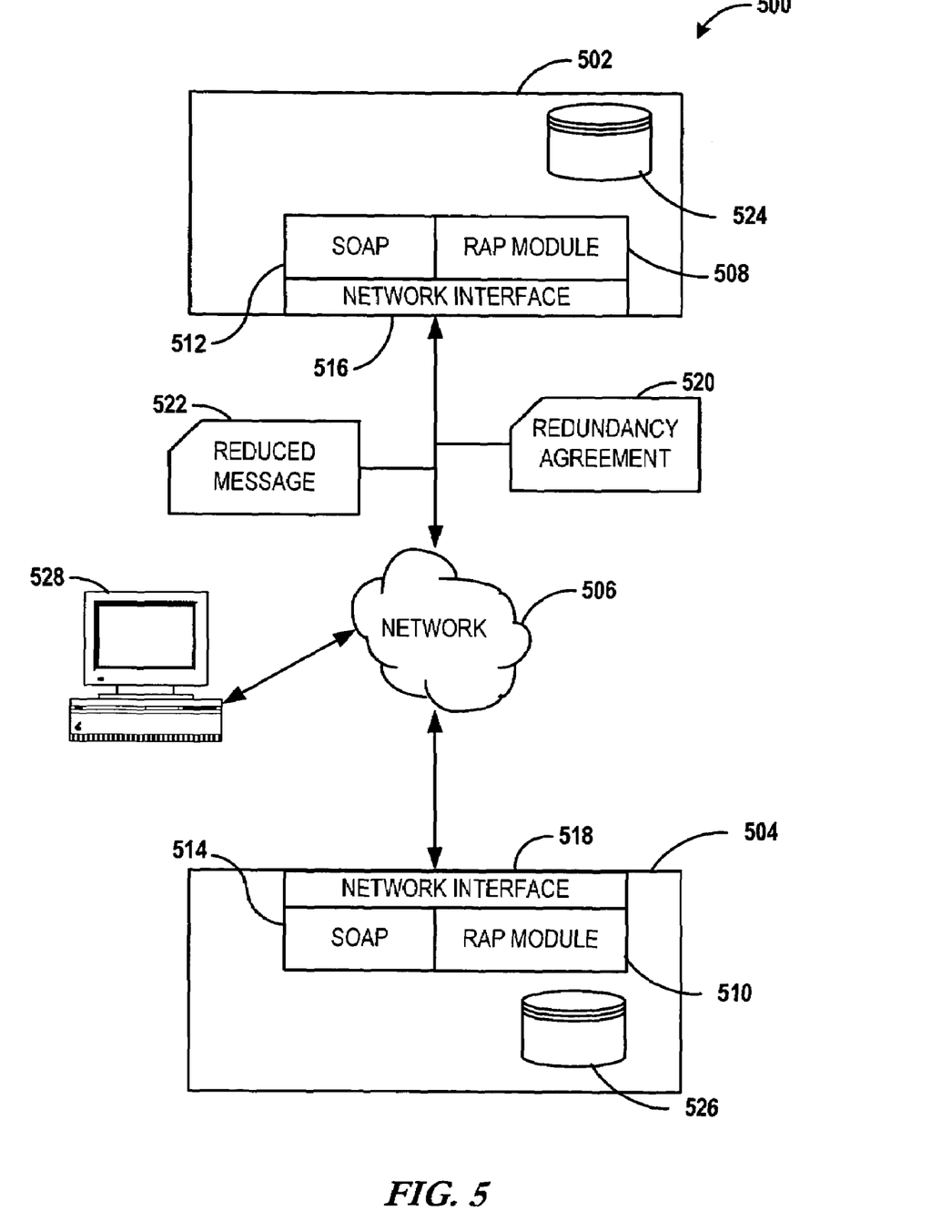
FIG. 5 illustrates an arrangement for providing Web service messaging with redundancy agreements between network entities according to embodiments of the present invention.
Figure 6:
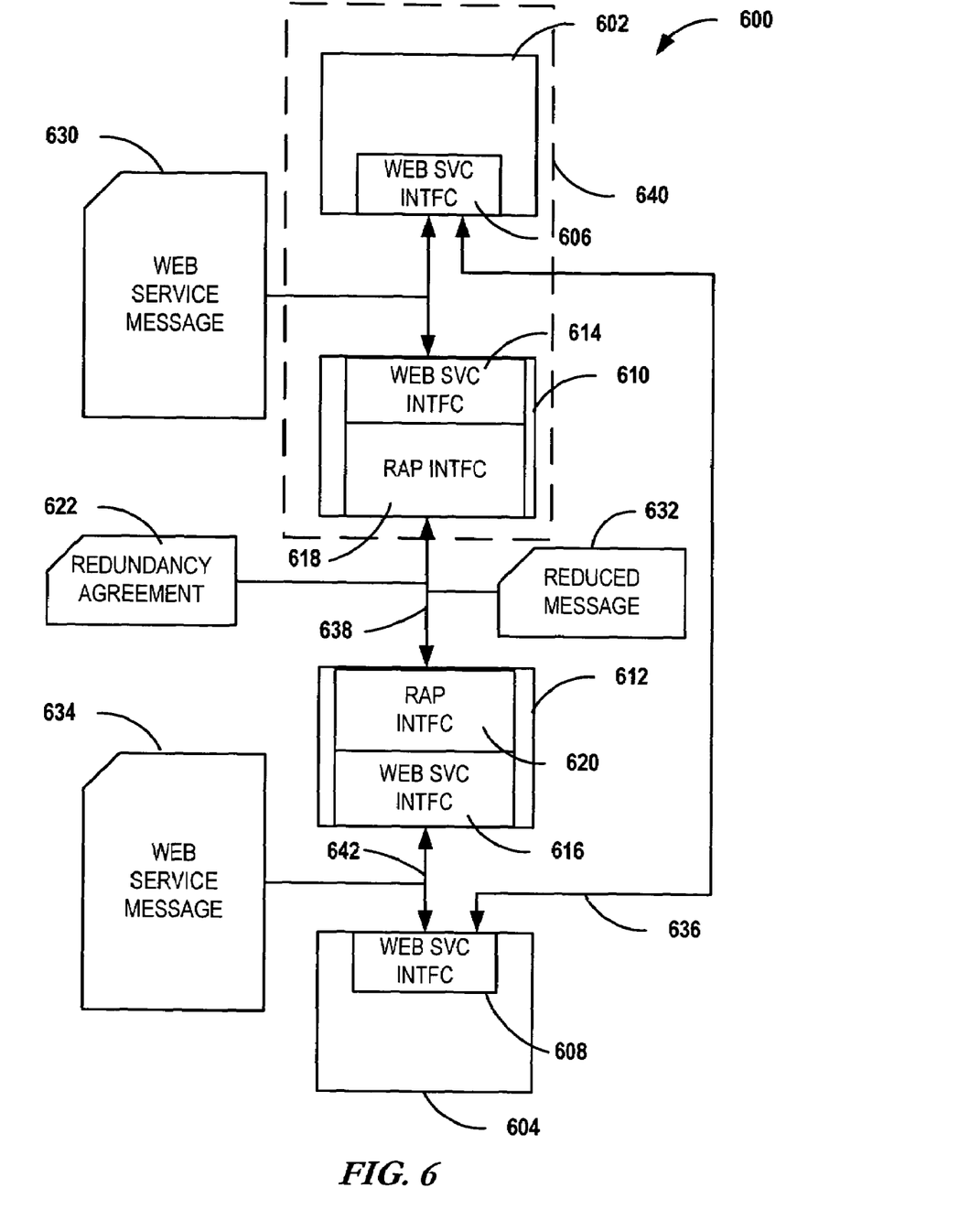
FIG. 6 illustrates another arrangement for providing Web service messaging with redundancy agreements between network entities according to embodiments of the present invention.

Although the Web service exchanges using redundancy agreements may be employed on any network arrangement, more particular arrangements are shown in FIGS. 5 and 6. In FIG. 5, a system 500 of directly communicating network entities utilizes redundancy agreements in accordance with embodiments of the present invention. The system includes a first network entity 502 and a second network entity 504 that are coupled via a network 506. The first and second network entities 502, 504 each include redundancy agreement modules 508, 510 that work in concert with Web services processing stacks 512, 514, respectively. The redundancy agreement modules 508, 510 and Web services processing stacks 512, 514 communicate over the network 506 through respective network interfaces 516 and 518. The network interfaces 516, 518 may include protocol stacks (e.g., TCP/IP, UDP/IP) and hardware drivers and devices (e.g., Ethernet, FDDI, etc.).

The entities 502 and 504 include ability to communicate redundancy agreements 520 for the purposes of Web service communications using reduced messages 522. The redundancy agreement modules 508, 510 provides the capability to form redundancy agreements, control RAP message exchanges, maintain state of all current redundancy agreements, and use the redundancy agreements to form and/or interpret Web service messages. The modules 508, 510 may be separate add-ons to the respective Web services stacks 512, 514, and/or may be completely incorporated into the stacks 512, 514.

Generally, the redundancy agreement modules 508, 510 can be configured to initiate and maintain redundancy agreements with any or all Web services communications between various network hosts. The redundancy agreement modules 508, 510 store data related to the redundancy agreements in storage arrangements 524, 526 of the respective entities 502, 504. It will be appreciated that the data may be host dependent. For example, redundancy agreements stored on the first network entity 502 for communications with the second network entity 504 are maintained separately from agreements with, for example, a third network entity 528.

The arrangement shown in FIG. 5 assumes that each entity engaged in Web service communication has the necessary redundancy agreement logic (such as in the modules 508, 510). However, there may be situations where it is difficult or impractical to implement RAP into the Web services logic at the network endpoints. In such a situation, the advantages of using redundancy agreements can still be obtained by using intermediate network entities as shown in FIG. 6.

In FIG. 6, an alternate system 600 of providing Web services using redundancy agreements is illustrated according to embodiments of the present invention. In this system 600, a first entity 602 and a second entity 604 may include standard Web service interfaces, 606 and 608, respectively. The source and destination entities 602, 604 can utilize existing Web service software modules, programming tools, and procedure calls. One or more intermediate nodes, as represented by intermediate nodes 610 and 612, may act as proxies or gateways for Web service communications using reduced messaging. The intermediate nodes 610, 612, typically include standard Web service interfaces, 614, and 616. The intermediate nodes 610, 612 communicate with respective entities 602, 604 using the standard Web services interfaces 614, 616, but the intermediate nodes 610, 612 can communicate with each other using the RAP interfaces 618, 620. This allows redundancy agreements to be used in a way that is transparent to end points such as entities 602, 604.

A Web service message 630 sent from the first entity 602 is received at the Web service interface 614 of intermediate node 610. The intermediate node 610 translates this message 630 to a reduced message 632 based on a redundancy agreement 622 between the intermediate entities 610, 612. The reduced message 632 is sent from a reduced message interface 618 of intermediate node 610 to a reduced message interface 620 of intermediate node 612. Intermediate node 612 uses a compatible set of criteria based on the redundancy agreement 622 to form a reproduced message 634 from the reduced message 632. The reproduced message 634 is sent from the Web service interface 616 to the SOAP interface 608 of the second entity 604. Sending messages in the other direction, from entity 604 to entity 602, operates similarly, with the intermediate nodes 610, 612 forming reduced messages and/or reproduced messages as appropriate.

In general, the system 600 shown in FIG. 6 allows a legacy Web service infrastructure to benefit from the use of redundancy agreements. The system 600 may also allow standard Web service message exchanges to occur directly between entities 602, 604, as represented by the path 636. The intermediate nodes 610, 612 may also be configured to handle only portion of standard Web service messaging (e.g., without forming reduced messages) between endpoints 602, 604, while other messages take the direct path 636 between entities 602, 604.

The use of intermediary nodes 610, 612 is useful when a data path 638 between the gateway nodes 610, 612 includes a low-bandwidth connection. A more typical situation, however, is where the low-bandwidth connection exists at a network entry point, such as a mobile data client. This data client may be represented in FIG. 6 as a unit 640 that encompasses both the network entity 602 and the intermediate node 610. For example, if the unit 640 represents a mobile device, the intermediate node 610 could be implemented as a processing module within the mobile device. Such a processing module may be an extension of the SOAP protocol stack, or may be implemented as a separate process that interfaces with the stack. In such an arrangement, the reduced message interface 618 of the unit 640 communicates with the intermediate node 612. The intermediate node 612 may be located anywhere on the network, preferably where the connection 642 between the intermediate node 612 and entity 604 includes a high bandwidth connection.

Figure 7:
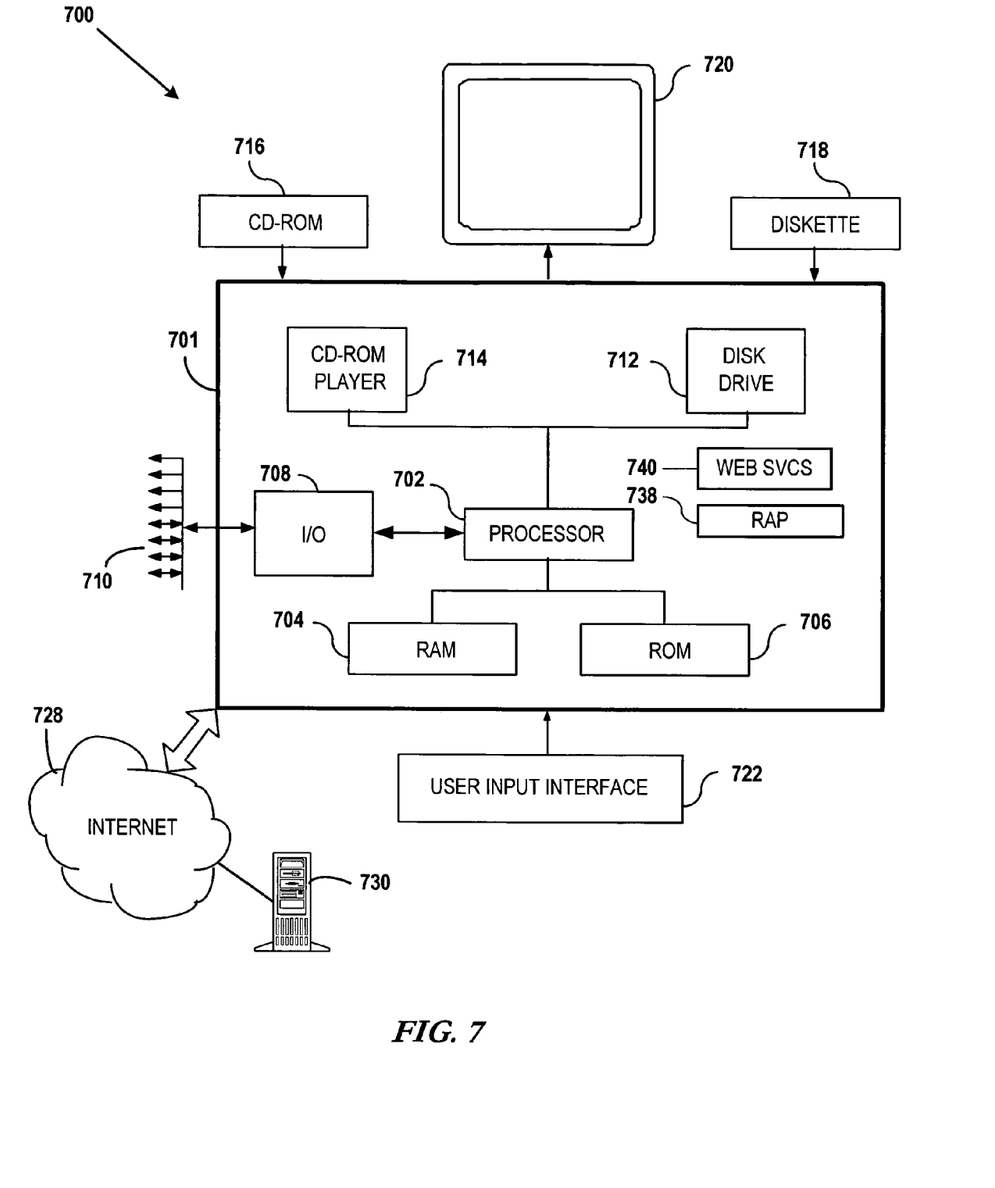
FIG. 7 illustrates a computing arrangement for processing of reduced messages according to embodiments of the present invention.

Hardware, firmware, software or a combination thereof may be used to perform the various messaging functions and operations described herein. The computing structure 700 of FIG. 7 is an example computing structure that can be used in connection with such a Web services messaging system. The example computing structure 700 suitable for performing the messaging activity in accordance with the present invention includes a computing arrangement 701. The computing arrangement 701 may act a server, client, gateway, proxy, router, or any other network entity used for processing and delivering Web service messages using redundancy agreements.

The computing arrangement 701 includes a central processor (CPU) 702 coupled to random access memory (RAM) 704 and read-only memory (ROM) 706. The ROM 706 may also be other types of storage media to store programs, such as programmable ROM (PROM), erasable PROM (EPROM), etc. The processor 702 may communicate with other internal and external components through input/output (I/O) circuitry 708 and bussing 710, to provide control signals and the like.

The memory of the computing arrangement 701 may be used to store processor executable instructions for carrying out various Web service related tasks. For example, processing of Web services messages and reduced messages, such as those exemplified in FIG. 3, may be performed by the computing arrangement 701 via a RAP processing module 738. The RAP module 738 may create and maintain redundancy agreements and messages related to those agreements.

The RAP processing module 738 can provide Web services communications using reduced messages. For example, the RAP processing module 738 may translate reduced messages into fully formed Web services messages for further processing by the Web services modules. In another arrangement, the RAP processing module 738 may add logic to the Web services module 740 such that reduced messages and redundancy agreements are processed by different instructions than standard Web service messages. The RAP processing module 738 and Web services messaging module 740 can be integrated into a single module or included as separate modules. Generally, the modules 738, 740 work in concert to invoke remote Web services by sending reduced messages and/or process Web services requests invoked via reduced messages.

External data storage devices, such as databases, used for accessing message reduction criteria, may be coupled to I/O circuitry 708 to facilitate messaging functions according to the present invention. Alternatively, such databases may be locally stored in the storage/memory of the computing arrangement 701, or otherwise accessible via a local network or networks having a more extensive reach such as the Internet 728. The processor 702 carries out a variety of functions as is known in the art, as dictated by software and/or firmware instructions.

The computing arrangement 701 may also include one or more data storage devices, including hard and floppy disk drives 712, CD-ROM drives 714, and other hardware capable of reading and/or storing information such as DVD, etc. In one embodiment, software for carrying out the messaging operations in accordance with the present invention may be stored and distributed on a CD-ROM 716, diskette 718 or other form of media capable of portably storing information. These storage media may be inserted into, and read by, devices such as the CD-ROM drive 714, the disk drive 712, etc. The software may also be transmitted to computing arrangement 701 via data signals, such as being downloaded electronically via a network, such as the Internet 728. The computing arrangement 701 may be coupled to a display 720, which may be any type of known display or presentation screen, such as LCD displays, plasma display, cathode ray tubes (CRT), etc. A user-input interface 722 may be provided, including one or more user interface mechanisms such as a mouse, keyboard, microphone, touch pad, touch screen, voice-recognition system, etc.

The computing arrangement 701 may be coupled to other computing devices, such as landline and/or wireless terminals via a network, for Web service messaging. The server may be part of a larger network configuration as in a global area network (GAN) such as the Internet 728, which allows connections to the various landline and/or mobile devices, such as host 730.

The computing arrangement 700 of FIG. 7 is provided as a representative example of a computing environment in which the principles of the present invention may be applied. From the description provided herein, those skilled in the art will appreciate that the present invention is equally applicable in a variety of other currently known and future mobile and land-line computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc.

Articles of manufacture encompassing code to carry out functions associated with the present invention are intended to encompass a computer program that exists permanently or temporarily on any computer-usable medium or in any transmitting medium that transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a messaging system, apparatus, and method in accordance with the present invention.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method, comprising:
   sending a redundancy agreement message to a network entity, the redundancy agreement message describing a redundancy agreement for invoking a Web service using reduced messages;
   forming a reduced message based on the redundancy agreement and a non-redundant portion of a Web service message configured for invoking the Web service;
   sending the reduced message to the network entity; and
   invoking the Web service at the network entity based on the reduced message and the redundancy agreement.

2. The method according to claim 1, wherein the Web service message comprises a SOAP message.

3. The method according to claim 1, wherein the reduced message comprises a SOAP message.

4. The method according to claim 1, wherein the redundancy agreement message comprises a SOAP message.

5. The method according to claim 1, wherein the redundancy agreement message comprises a binary formatted message.

6. The method according to claim 1, wherein the redundancy agreement comprises a mapping of identifiers to content strings, wherein the content strings are based on a non-redundant portion of the Web service message.

7. The method according to claim 6, wherein the content strings are base64 encoded.

8. The method according to claim 1, further comprising receiving a redundancy agreement reply message from the network entity in response to the redundancy agreement message.

9. The method according to claim 8, wherein the redundancy agreement reply message comprises a suggested modification to the redundancy agreement.

10. The method according to claim 1, wherein the redundancy agreement message is included in a non-reduced Web service message.

11. The method according to claim 10, wherein the redundancy agreement message is included in a message header of the non-reduced Web service message.

12. The method according to claim 1, wherein invoking the Web service at the network entity based on the reduced message and the redundancy agreement comprises
   creating a template based on the redundancy agreement; and
   forming a replicated Web service message from the template by replacing portions of the template with selected portions of the reduced message.

13. The method according to claim 12, wherein at least one of a) the selected portions of the reduced message and b) the portions of the template, comprise LISP encoded values.

14. The method according to claim 12, wherein at least one of a) the selected portions of the reduced message and b) the portions of the template, comprise base64 encoded values.

15. The method according to claim 12, wherein at least one of a) the selected portions of the reduced message and b) the portions of the template, comprise XML elements.

16. The method according to claim 12, wherein the reduced message includes one or more XML processing instructions indicating the portions of the template to be replaced and the selected portions of the reduced message.

17. The method according to claim 16, wherein the one or more XML processing instructions are base64 encoded.

18. The method according to claim 1, further comprising determining a quality measurement based on sizes of the reduced message and the Web service message.

19. The method according to claim 18, wherein the quality measurement is used to determine a form of the redundancy agreement.

20. The method according to claim 18, wherein the quality measurement is used to determine whether to utilize the redundancy agreement.

21. An apparatus, comprising:
   a network interface;
   a memory capable of storing at least one of a redundancy agreement module and a Web services processing module;
   a processor coupled to the memory and the network interface and configured by redundancy agreement module to form redundancy agreement messages describing redundancy agreements for invoking Web services using reduced messages, the processor configured by the Web services module to send the redundancy agreement messages and the reduced messages via the network interface using a Web service protocol for purposes of invoking the Web service.

22. The apparatus according to claim 21, wherein the Web services processing module comprises a SOAP processing module.

23. The apparatus according to claim 21, wherein the reduced message comprises a SOAP message.

24. The apparatus according to claim 21, wherein the redundancy agreement message comprises a SOAP message.

25. The apparatus according to claim 21, wherein the redundancy agreement message comprises a binary formatted message.

26. The apparatus according to claim 21, wherein the redundancy agreement comprises a mapping of identifiers to content strings, wherein the content strings are based on a non-redundant portion of a Web service message configured for invoking the Web service.

27. The apparatus according to claim 21, wherein the processor is further configured to receive a redundancy agreement reply message in response to the redundancy agreement message.

28. The apparatus according to claim 27, wherein the redundancy agreement reply message comprises a suggested modification to the redundancy agreement.

29. The apparatus according to claim 21, wherein the redundancy agreement message is included in a non-reduced Web service message.

30. The apparatus according to claim 21, wherein the reduced message includes one or more XML processing instructions indicating a non-redundant portion of a Web service message configured for invoking the Web service.

31. The apparatus according to claim 21, wherein the processor is further configured by the redundancy agreement module to determining a quality measurement based on sizes of the reduced message and a Web service message configured for invoking the Web service.

32. The apparatus according to claim 31, wherein the quality measurement is used to determine whether to utilize the redundancy agreement.

33. The apparatus according to claim 31, wherein the quality measurement is used to determine a form of the redundancy agreement.

34. The computing arrangement according to claim 21, wherein the network interface comprises a wireless network interface.

35. The apparatus according to claim 34, wherein the computing arrangement comprises a mobile terminal.

36. A system, comprising:
means for sending a redundancy agreement message to a network entity, the redundancy agreement message describing a redundancy agreement for invoking the Web service using reduced messages;
means for forming a reduced message based on the redundancy agreement and a non-redundant portion of a Web service message configured for invoking the Web service;
means for sending the reduced message to the network entity; and
means for invoking the Web service at the network entity based on the reduced message and the redundancy agreement.

37. The system according to claim 36, further comprising means for determining a quality measurement based on the sizes of the reduced message and the Web service message.

38. A computer-readable medium comprising:
stored instructions which are executable by a computing arrangement by
sending a redundancy agreement message to a network entity for purposes of invoking a Web service, the redundancy agreement message describing a redundancy agreement for invoking the Web service using reduced messages;
forming a reduced message based on the redundancy agreement and a non-redundant portion of a Web service message configured for invoking the Web service;
sending the reduced message to the network entity; and
invoking the Web service at the network entity based on the reduced message and the redundancy agreement.

39. The computer-readable medium according to claim 38, wherein the redundancy agreement message comprises a SOAP message.

40. The computer-readable medium according to claim 38, wherein the redundancy agreement message comprises a binary formatted message.

41. The computer-readable medium according to claim 38, wherein the redundancy agreement comprises a mapping of identifiers to content strings, wherein the content strings based on a non-redundant portion of the Web service message configured for invoking the Web service.

42. The computer-readable medium according to claim 38, further comprising sending a redundancy agreement reply message from the network entity in response to the redundancy agreement message.

43. The computer-readable medium according to claim 42, wherein the redundancy agreement reply message comprises a suggested modification to the redundancy agreement.

44. The computer-readable medium according to claim 38, wherein the redundancy agreement message is included in a non-reduced Web service message.

45. The computer-readable medium according to claim 44, wherein the redundancy agreement message is included in a message header of the non-reduced Web service message.

46. The computer-readable medium according to claim 38, wherein the reduced message includes one or more XML processing instructions indicating a non-redundant portion of the Web service message.

47. The computer-readable medium according to claim 38, wherein the steps further comprise determining a quality measurement based on the sizes of the reduced message and the Web service message.

48. The computer-readable medium according to claim 47, wherein the quality measurement is used in determining whether to form the redundancy agreement.

49. An apparatus, comprising:
means for receiving a redundancy agreement message from a network entity, the redundancy agreement message describing a redundancy agreement for invoking a Web service using reduced messages;
means for receiving a reduced message based on the redundancy agreement and a non-redundant portion of a Web service message configured for invoking the Web service; and
means for invoking the Web service based on the reduced message and the redundancy agreement.

50. The apparatus according to claim 49, further comprising means for sending a reduced response message to the network entity in response to invocation of the Web service, the reduced response message based on a second redundancy agreement established between the computing arrangement and the network entity.

51. An apparatus, comprising:
means for receiving a redundancy agreement message from a first Web service entity, the redundancy agreement message describing a redundancy agreement for supporting a Web service invocation using reduced messages;

means for receiving a reduced message based on the redundancy agreement and a non-redundant portion of a Web service message configured to support the Web service invocation;

means for converting the reduced message to a replica of the Web service message based on the reduced message and the redundancy agreement; and means for sending the replica of the Web service message to a second Web service entity in support of the Web service invocation.

52. The apparatus according to claim 51, further comprising:

means for receiving a Web service response message from the second Web service entity; and means for sending to the first Web service entity a reduced response message, the reduced response message based on the Web service response message and a second redundancy agreement established between the computing arrangement and the first Web service entity.

* * * * *